J. L. TUSTEN.
Animal Trap.
No. 96,744.
Patented Nov. 9, 1869.
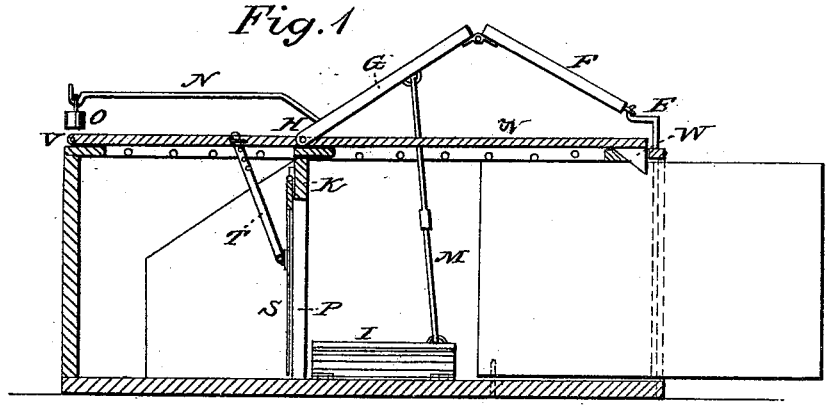
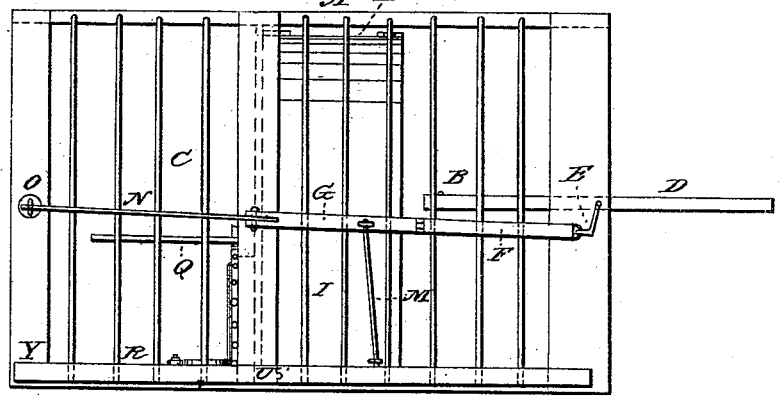
Witnesses:
Inventor:

United States Patent Office.

J. L. TUSTEN, OF WINONA, ASSIGNOR TO MRS. E. S. TUSTEN, OF CARROLLTON, MISSISSIPPI.

Letters Patent No. 96,744, dated November 9, 1869.

---

IMPROVED ANIMAL-TRAP.

---

The Schedule referred to in these Letters Patent and making part of the same.

---

*To all whom it may concern:*

Be it known that I, J. L. TUSTEN, of Winona, in the county of Carroll, and State of Mississippi, have invented a new and improved Animal-Trap; and I do hereby declare that the following is a full, clear, and exact description thereof, which will enable others skilled in the art to make and use the same, reference being had to the accompanying drawings, forming part of this specification.

This invention relates to improvements in animal-traps, whereby it is designed to provide a simple and efficient trap, so arranged that after an animal is caught he will, in passing from a first dark compartment to a second lighter one, reset the trap.

The invention comprises the combination, in a box or case, of two compartments, with a hinged and vertically-swinging door between them, of a horizontally-swinging door opening into the first compartment, a hinged platform within the said first compartment, suspended from a pair of knuckle-jointed bars, one of which is connected to the outer door, for closing and opening it by the action of the weight of the animal on the platform; a counterweight, for closing the door; and a drop-catch, for securing it, under a simple and efficient arrangement, whereby the animals secured are caused to reset the trap, all as hereinafter specified.

Figure 1 represents a longitudinal sectional elevation of my improved trap, and

Figure 2 represents a plan view of the same.

Similar letters of reference indicate corresponding parts.

A is the case, having two compartments, B and C, one of which, B, is intended in practice to be covered at the top, so as to exclude the light thereat.

D is the door opening from the exterior to the first compartment. It is journalled at the centre, and turns in a horizontal plane.

The journal is provided with a crank, E, at the upper end, to which one end of one of a pair of toggle-jointed bars, F G, is connected, the other being connected to the top of the case at H.

I is a platform arranged on the bottom of the compartment B, alongside of the partition K, with one end L hinged to the floor, and the other connected, by a rod, to the toggle-jointed bar G, so as to be suspended above the bottom of the compartment.

N is an arm connected to the bar G, near its joint, with the case, and projecting rearward, for holding a balance-weight, O, which is intended to hold the toggle-arms up, and the door D in the open position.

At the side of the case, where the free end of the platform is, an opening, P, is made through the partition K, leading into the compartment C.

Q is a wall in the compartment C, on the side of this opening, opposite to the wall R of the case, and parallel with it.

S is a door hinged to the partition K, above the opening P, and opening into the compartment C. It is connected, by a link, T, to a catch-bar, U, hinged to the rear side of the case at V, and provided with a triangular catch-plate, W, at the front end, projecting down through the top of the case into the path at the end of the door D, when closing, so that the door will raise the said catch in closing, and pass under it, when it will fall behind the closed door, and hold it shut.

The trap being set in the position represented in the drawing, with the door open, in which position it is held by the weight, and any suitable bait placed in the compartment B, so as to induce the animals, after entering, to step on the free end of the platform, the door will thereby be closed, the weight of the animal pressing the platform down, and in closing, the catch-plate W will fall behind it, and secure it, as above stated.

The animal finding itself entrapped, and making efforts to escape, naturally endeavoring to go in the direction of the light coming in at the door S, which is made to admit the same, will force his way through the said door, by which he will raise the catch-bar U, when the weight O will swing the door open, again resetting the trap.

If the animal, seeing the door open, attempts to return before the door S is quite down, he will again, by his weight on the platform, close the door, so that it is impossible for him to get out.

The wall Q prevents other animals in the compartment C from taking advantage of the opportunity to escape by passing under the side of the door S while one animal is entering.

These traps may be made larger or smaller, according to the animals which it is desired to catch.

Having thus described my invention,

I claim as new, and desire to secure by Letters Patent—

The combination, in a case A, having two compartments, of the door D, crank E, jointed arms F G, weighted arm N, rod M, platform I, door S, link T, and catch-bar U, constructed and arranged to operate as herein described.

J. L. TUSTEN.

Witnesses:
E. O. HUNTLEY,
W. P. SHRYOCK.